(No Model.)  5 Sheets—Sheet 1.
C. J. ZEITINGER.
DEVICE FOR UTILIZING THE WATER POWER OF FALLS.
No. 442,000.  Patented Dec. 2, 1890.

(No Model.) 5 Sheets—Sheet 2.

C. J. ZEITINGER.
DEVICE FOR UTILIZING THE WATER POWER OF FALLS.

No. 442,000. Patented Dec. 2, 1890.

Witnesses:
J. G. Leffer
F. A. Hopkins

Inventor:
Christian J. Zeitinger.
By Knight Bros.
Attorneys.

(No Model.) 5 Sheets—Sheet 3.
C. J. ZEITINGER.
DEVICE FOR UTILIZING THE WATER POWER OF FALLS.
No. 442,000. Patented Dec. 2, 1890.
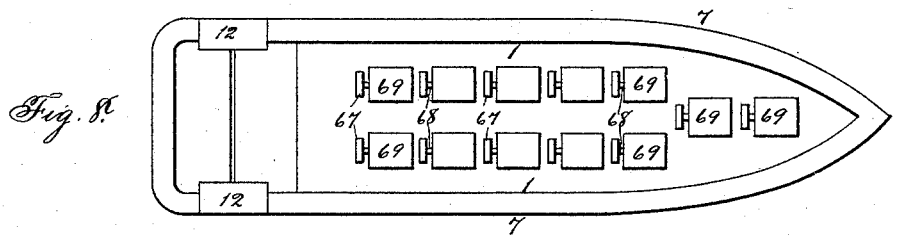
Fig. 8.
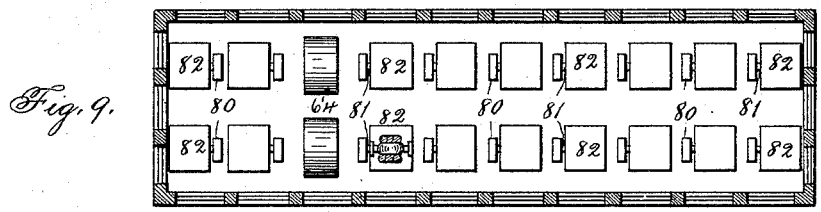
Fig. 9.
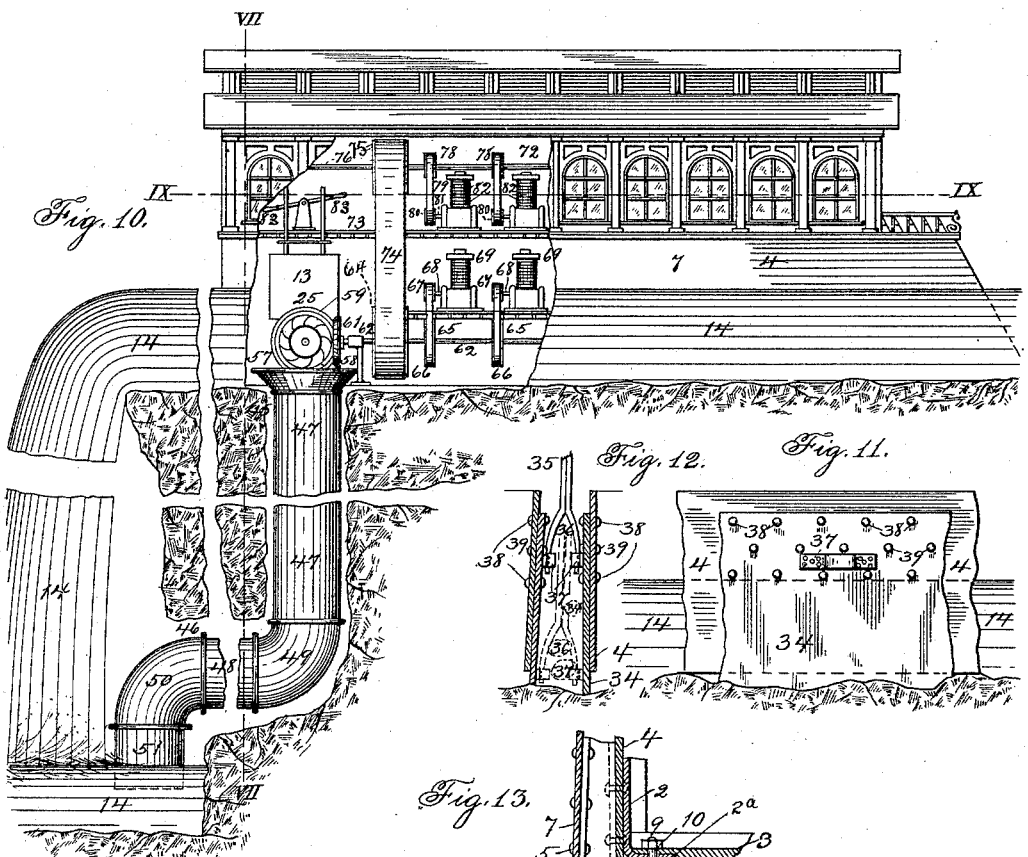
Fig. 10.
Fig. 11. Fig. 12. Fig. 13.
Witnesses:
J. G. Lepper
F. A. Hopkins
Inventor:
Christian J. Zeitinger
By Knight Bros.
Attorneys.

(No Model.)
5 Sheets—Sheet 4.
C. J. ZEITINGER.
DEVICE FOR UTILIZING THE WATER POWER OF FALLS.
No. 442,000.
Patented Dec. 2, 1890.
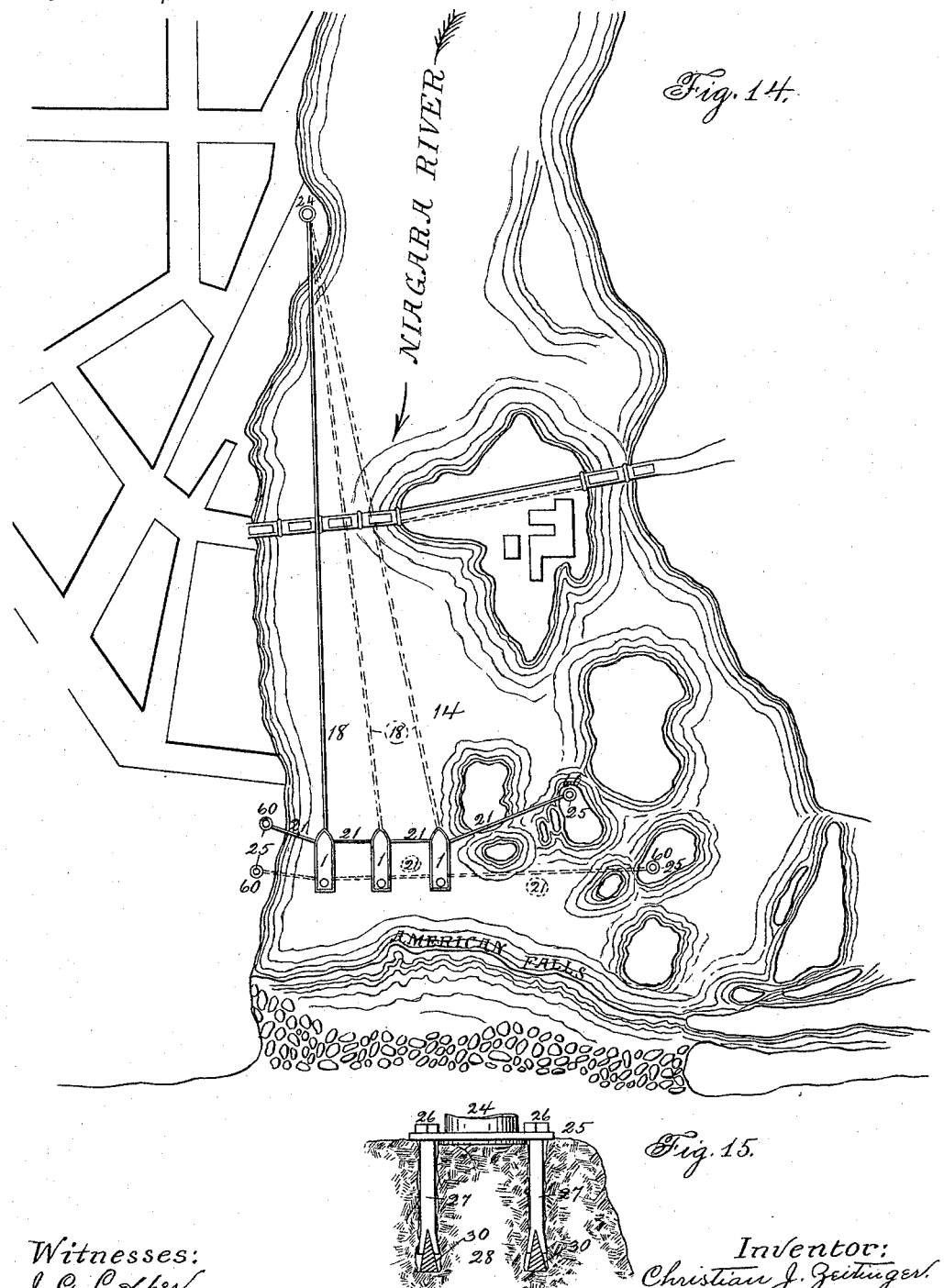
Witnesses:
J. G. Leffer
F. A. Hopkins
Inventor:
Christian J. Zeitinger
By Knight Bros.
Attorneys.

(No Model.) 5 Sheets—Sheet 5.

C. J. ZEITINGER.
DEVICE FOR UTILIZING THE WATER POWER OF FALLS.

No. 442,000. Patented Dec. 2, 1890.

Witnesses:
J. G. Lepper.
F. A. Hopkins.

Inventor:
Christian J. Zeitinger.
By Knight Bros.
Attorneys.

THE NORRIS PETERS CO., PHOTO-LITHO., WASHINGTON, D. C.

UNITED STATES PATENT OFFICE.

CHRISTIAN J. ZEITINGER, OF ZEITONIA, MISSOURI.

DEVICE FOR UTILIZING THE WATER-POWER OF FALLS.

SPECIFICATION forming part of Letters Patent No. 442,000, dated December 2, 1890.

Application filed April 19, 1890. Serial No. 348,720. (No model.)

*To all whom it may concern:*

Be it known that I, CHRISTIAN J. ZEITINGER, of the city of Zeitonia, in the county of Wayne and State of Missouri, have invented certain new and useful Improvements in Devices for Utilizing Water-Power of Falls, of which the following is a full, clear, and exact description, reference being had to the accompanying drawings, forming part of this specification.

The invention relates to devices for utilizing the at present waste power that is engendered by the descent of water in the vicinity of natural falls; and the invention consists in features of novelty hereinafter fully described, and pointed out in the claims.

Figure 1:
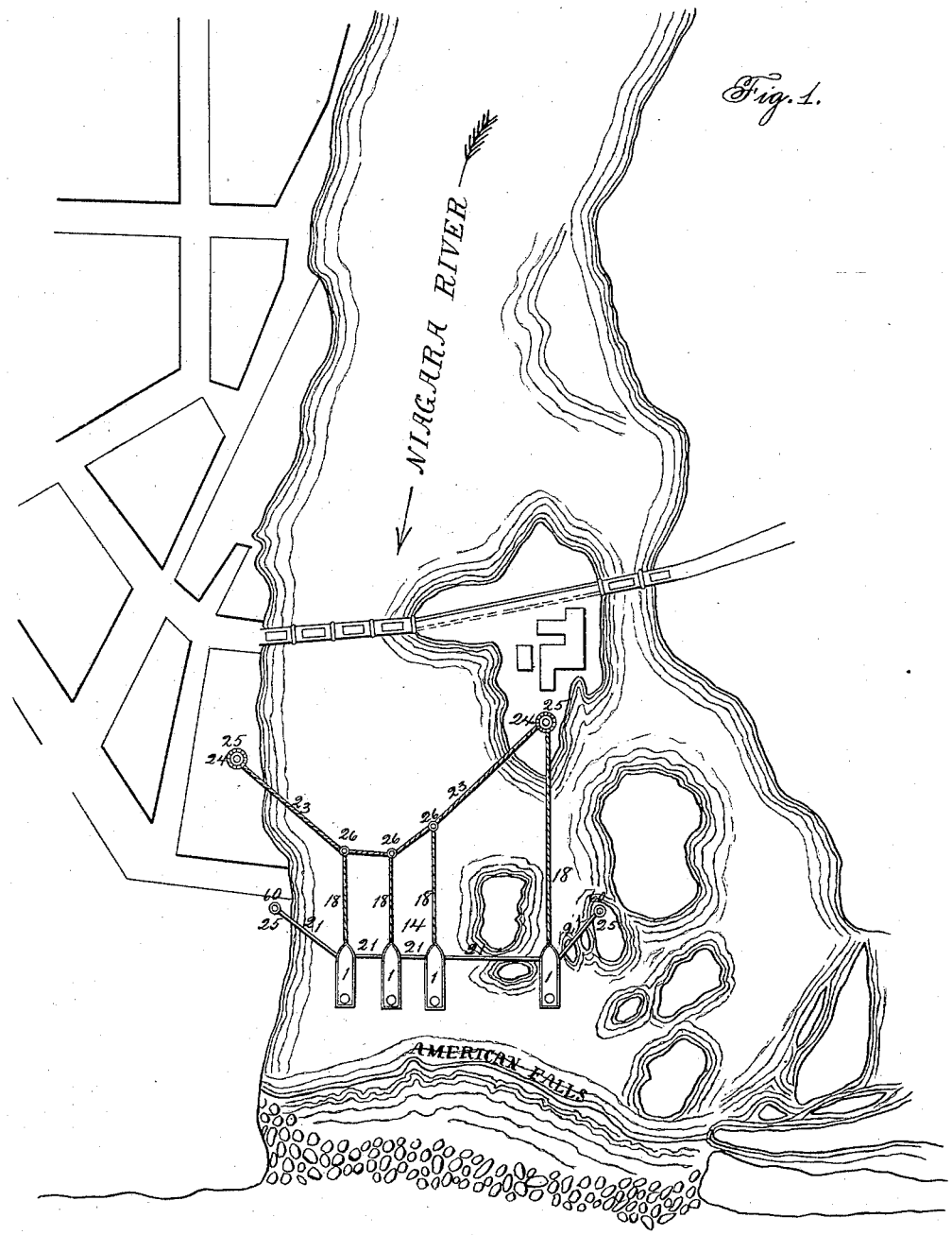
Figure 2:
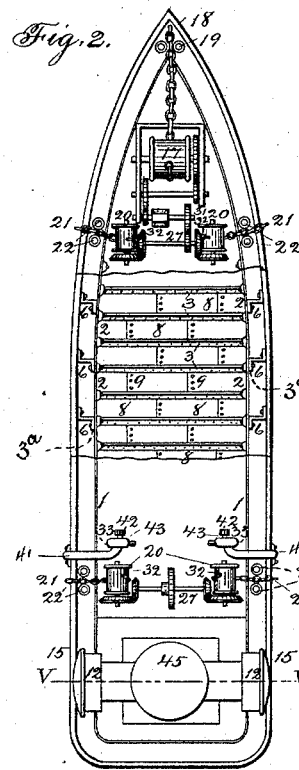
Figure 3:
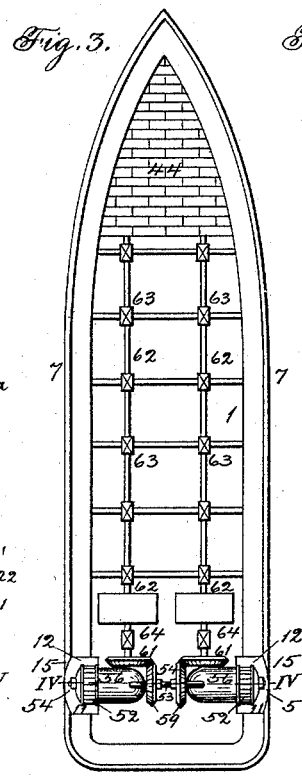
Figure 4:
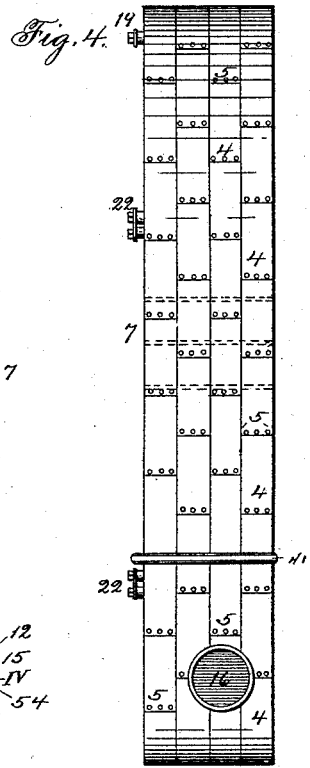
Figure 5:
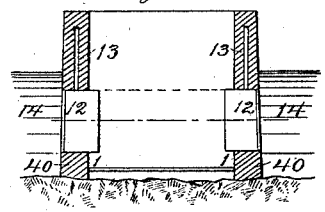
Figure 6:
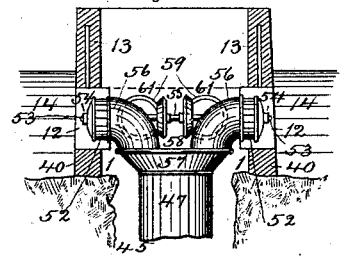
Figure 7:
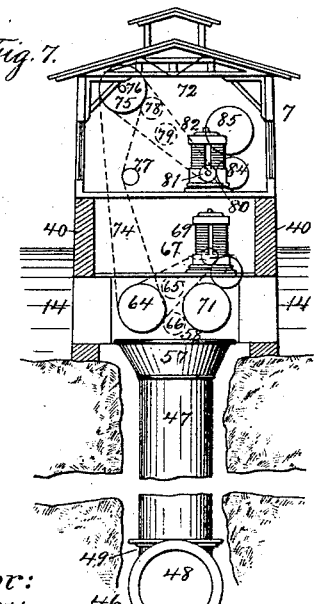
Figure 16:
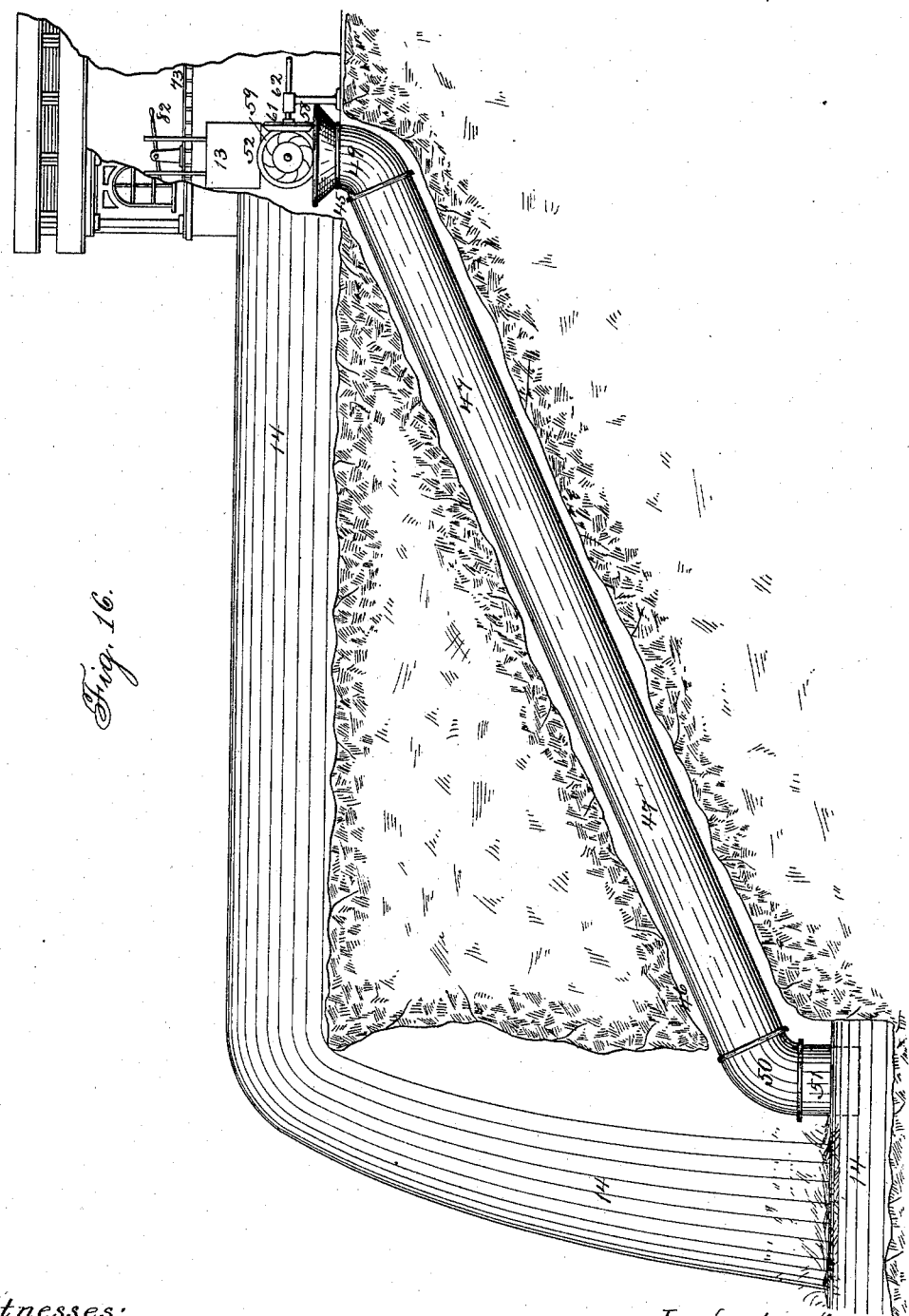

Figure 1 is a perspective view of the American side of the Falls of Niagara, and shows the coffer-dams, their cable-moorage, and guy-stays. Fig. 2 is an enlarged top view of one of the coffer-dams, showing details of the lower deck fore and aft, and broken away amidship to show the detachable angle-iron, bilge-sills, and steel bilge-plates of the removable bottom of said coffer-dam. It also shows on the forecastle-deck the windlass-drum that carries, winds up, and pays out the moorage-cable. On the detail of the deck aft is shown the rotary pumps and their suction-pipes by which the hold of the coffer-dam is either respectively flooded or emptied of water. The side-guy cable-drums and the bevel-gear that drives the cable-moorage and guy-drums are also shown, and in outline the turbine chambers and entrance to the tail-race shaft. Fig. 3 is a like view of the coffer-dam on the lower deck or below deck and shows the turbine wheels within the wheel-chamber, the suction sluiceway through the quarter-turn draft-tubes, and the bevel pinion-gear that transfers the power generated by the turbines to the shafts that work the friction-generators for the electric dynamos or other suitable motor-power. It also shows the abutting masonary built up from the bed-rock in the bottom of the coffer-dam. Fig. 4 is a side view of one of the coffer-dams, and shows the steel-plate sheeting that covers the hull, the grated inlet to one of the waterways to the turbine-wheel chamber on that side the coffer-dam, and the gunwale-sheaves that guide the mooring and guy cables as they are paid out and drawn in. Fig. 5 is a transverse vertical section taken on line V V,
Fig. 2, and shows the wheel-chambers in the coffer-dam with the flood-gates elevated to let on the water to the turbines. Fig. 6 is a like view, taken on line IV IV, Fig. 3, and shows the flood-gates elevated, the sluiceways into the turbine-chambers, the turbine wheels, the suction quarter-turn pipes from the turbines, the tail-race shaft into which said pipes discharge, and the bevel pinion-gear that transfers the power from the turbine-shafts to the drive-shafts of the dynamos. Fig. 7 is a detail section taken on line VII VII, Fig. 10 and shows the coffer-dam, the tail-race shaft, the angle drift-shaft that leads toward the outlet-pipe at the foot of the falls. It also shows a transverse section of the structure above the coffer-dam, and the belted and friction means of transmitting power from the turbines to the dynamo; Fig. 8, a top view of one of the coffer-dams, and shows the lower tier of dynamos on the lower deck of said coffer-dam; Fig. 9, a horizontal section taken on line IX IX, Fig. 10, and shows the upper deck, the surmounting structure above said deck, the system of dynamos, and the endless drive-belts that transfer power from the drive-pulley drum of the lower drive-shaft to that of the upper drive-shaft. Fig. 10 is a detail elevation, part in section and part broken away to show the interior arrangements for engendering and transmitting power, and shows the coffer-dam, the structure above the same, also the tail-race, the drift-shaft, and the vertical outlet through which the water is discharged at the foot of the falls. Fig. 11 is an enlarged detail view of one of the skirting plates, its lower edge cut to fit the irregularities in the bed-rock. Fig. 12 is an enlarged end or edge view and shows the skirting plates cut to fit irregularities in the bedrock, the said plates being held by the spring-fork while lowering and while being riveted or bolted above the water-mark to the hull of the coffer-dam and to its incasement-jacket. Fig. 13 is an enlarged detail section vertical of one of the angle-iron detachable bilge-sills, the steel-bottom bilge-plates, and a side rib of the hull of the coffer-dam to which said detachable bilge-sills and steel plates are attached by screw-nutted bolts; and Fig. 14 is a plan view of a modification in which the cable-moorage is effected direct from a projecting promontory upstream. It also shows the coffer-dam guyed both fore and aft. Fig. 15 is an enlarged vertical detail section of the stanchion attachment. Fig. 16 is a modification, showing the tail-race running in a straight line from the coffer-dam into the river below the falls.

Referring to the drawings, 1 represents the hull of the coffer-dam, the frame of which is constructed with side ribs 2 and bottom or bilge sills 3. Steel plates 4 are secured to said side ribs 2 of the hull by the rivets 5 and similar plates 7, and a like number are secured by rivets, also numbered 5, to the outer angle-flange of the double-flanged bracket-ribs 6, whose inner flanges $3^a$ are secured to the outsides of the steel plates 4 of the hull of the coffer-dam also by rivets numbered 5. These double-flanged bracket-ribs increase in width from the top to the bottom of the coffer-dam, and thus leave an intervening space between the hull of the coffer-dam and its surrounding incasement-jacket formed by the plates 7, that flare outwardly from the hull from the top to the bottom.

8 represents the movable steel bottom or bilge plates, which are not a permanent fixture of the structure, but are secured to and preferably below the bottom of the also removable bottom or bilge angle-iron sills 3 by the screw-nutted bolts 9, which pass through registering perforations 10 in the lap edges of said bilge-plates, in the bottom flange of the angle-iron bilge-sills, and in a bottom flange or bend $2^a$ of the side ribs 2, the said flange $2^a$ and bottom sills being mortised together, as shown in Fig. 13. A tight and at the same time removable bottom is thus formed to the hull of the coffer-dam, which bottom does not extend to the incasement-jacket 7, for reasons that will afterward, as we advance in the description, become evident, the intervening space between the hull and said jacket being left open at both top and bottom.

The coffer-dams are built of any suitable size adapted to the power to be developed, and are approximated to the shape of a flat-boat. Near the aft or stem of the hull of the coffer-dam and its incasement-jacket are located two flume-chambers 11, one on each side, that pass through both the casing and the hull, the ports 12 of which flumes are provided with flood-gates 13 to close down on the flow of water when required. The size of said flumes, the entrance-ports thereto, and the flood-gates that work therein are regulated according to the amount of power to be developed, and in consequence the amount of water 14 to pass through the flume. The entering-port to the flume is provided with a shield-cap 15, having a grated screen 16, to prevent the ingress of fragments of ice, wood, &c.

17 represents the major drum-windlass secured on the forecastle of the main-deck, around which windlass is wound the cable 18, which adjusts and holds the coffer-dam longitudinally to its position in the river.

19 are gunwale-sheaves for the guidance of said cable over the bow of the coffer-dam.

20 are the minor drum-windlasses fore and aft on the main-deck. These windlasses carry the guy-cables 21, which pass through the gunwale-sheaves 22, that are secured fore and aft at the bulwarks of the coffer-dam. The out ends of said guy-cables are secured to strong metal columns or stanchions 60 on the banks of the river or islands.

In relation to the anchorage or stationary attachment of the moorage-cable, a transverse cable 23 may be secured at each end on the opposite banks of the river or branch of the river above the falls, as shown in Fig. 1, in which, to illustrate the application of the invention, is presented a view of the American side of the Niagara river above the Falls of Niagara. The ends of said cables are securely fastened to strong metal columns or stanchions 24 on the banks of the river or on islands in the stream, which, as also the stanchions 60 for the attachment of the guy-cables, are provided with foot-flanges, which form collar-braces 25, that brace the collar or stanchions from tilting. When the banks of the river are not of rock, the feet of the stanchions below said collar should be sunk to a sufficient depth in the ground to firmly hold the same. When, on the other hand, the banks are of rock, as is generally the case in the neighborhood of falls, the falls being caused by a transverse ledge across the line of the stream, the stanchions may be then secured by bolts 26, that pass through said collar-flanges 25, and are seated in drilled holes 27 in the rock 28 beneath, and which are fastened therein by wedges 29, entered in the split lower ends 30 of said bolts, which, as they engage against the bottom of the drill-holes, are driven up within the split of the bolts, which are thus expanded at the lower ends and firmly clamped in said drill-holes.

The individual moorage-cable 18 from the major windlass on the coffer-dam is in each case secured by belaying or other suitable means at 26 to that part of the transverse cable that is a direct line upstream from the required location of said coffer-dam.

The windlass-drums of both the moorage and guy cables may be driven on each coffer-dam by a donkey-engine or other engine, the power being transmitted by systems of bevel-pinion drive-gear 27, as shown in Fig. 2.

In Fig. 1, in which I have shown a diagram of the American side of the Falls of Niagara, I have shown the above-described transverse moorage-cable secured at one end to a stanchion 24 of the American bank of the river above the falls, and at the other end to a stanchion on Goat Island, to which transverse cable, as stated, the individual moorage-cables 18 from the bows of the coffer-dams are secured at various points 26 along said transverse cable; but I do not confine myself to said means of in a measure indirect moorage, for, as is the case in the American branch of Niagara river, there is a turn in the course of the stream above the falls, I may then effect the moorage of the coffer-dams by individual direct moorage-cables, as shown in Fig. 14, that run from the bows of the coffer-dam in a direct line to the stanchion-column 24, that is firmly planted in a projecting promontory on the bank of the river above. In such case either three separate moorage-cables may be used, or, as shown in said figure in broken lines, a cable having been used to locate and hold each successive coffer-dam until it is firmly planted and secured on the bed-rock, as in the two coffers to the right hand in the figure, it is again available for the moorage of the remaining coffer-dam to which it is secured and shown in full lines on the left hand, until it is also securely planted on the bed-rock.

I have shown and described the windlass-drums that carry the moorage and guy cables, also the drive-gear and the power that operates the same as on the coffer-dams themselves; but I do not thus confine myself, for the windlass-drums and the power-gear that works the same may be, and in certain cases it would preferably be, located on the bank or banks of the river, or on islands in the stream, at the reverse ends of said cables.

When the coffers are all held until planted by direct moorage-cables from the one stanchion-column, as shown in Fig. 14, I prefer to provide a system of guy-ropes aft, as shown in broken lines in said figure, as well as forward, as shown in full lines, so as to bring the adjustment of said coffers in direct line with the course of the stream, the said guy-cables being secured to stanchion-columns planted in suitable positions either on the banks of the river or on islands in mid-stream.

When the drum-windlasses that carry, adjust, and hold the moorage and guy cables are located on the rock banks of the river or of the islands therein instead of on the coffer-dams themselves, then the platforms to which they are secured are anchored or fastened to the rock on which they stand by similar bolts 26 to those that fasten the stanchion-columns, (whose place they take,) the said bolts being seated (as in the case of the columns) in drill-holes in said rock, in which they are clamped by wedges that enter the split ends of said bolts.

The coffer-dams may be launched upstream in the immediate vicinity of the stanchion-column or other moorage-stay that holds the ground end of the moorage-cable, and then drifted downstream to the location where they are to be sunk and where they are held captive until securely grounded on the bed-rock, the guy-cables at the same time being secured and adjusted to locate the lateral position of the coffer. Otherwise the coffer-dams may be launched broadside on about opposite their ultimate location, the moorage-cable being securely attached before launching, so as to hold the coffer-dam captive. The guy-cables are then adjusted to swing the coffer in the stream to the lateral position required. The windlass-drums that carry the moorage and guy cables are to be kept under the control of the engines until the above-described location of the coffer-dams has been effected. The locking-dogs 31 are then brought into engagement with the drums of the moorage-windlasses and similar locking-dogs 32 into engagement with the drums of the guy-windlasses, thus securely holding the cables, and through them the coffer-dams, in their adjusted captive position. If the coffer-dam has been allowed to drift down too far, the moorage-windlass drums may be turned by the application of power from the said engines and the moorage-cables wound up thereon until the coffer has attained or regained its required position. Suitable connecting-gears and pulley-belting from the engines to the rotary pumps 33 are then started, and water is thus pumped into the hold of the coffer-dams until they are sufficiently weighted to sink them to the bed-rock beneath the river. The sides of the hull of the coffer-dam and of the incasement-jacket that surrounds it are of sufficient height to reach a few feet above high-water mark when the coffer-dam has been sunk.

In a suitable position for the location of the coffer-dams above the Falls of Niagara the depth generally ranges in the neighborhood of twelve feet.

Two series of supplemental skirt metal plates 34, preferably of steel, whose bottom edges have been cut to fit irregularities in the surface of the bed-rock, are then lowered, preferably by means of steel forks 35, whose prongs 36 are held in the brackets 37, that are riveted to said plates. One series is placed outside the hull-plates and the other series inside the plates of the incasement-jacket, and they are respectively secured by rivets 38, that are seated in perforations 39 in said skirt-plates and in the hull and incasement-jacket plates above the water-line, as shown in Figs. 11 and 12. When there is sufficient movement in the water to overcome the friction of the bottom surface of said skirt-plates on the bed-rock, so that they will not remain steadily in position while being riveted and during the process next to be described, then the prongs of the spring-forks are seated in the brackets 37, that are riveted to the skirt-plates near their lower edges before the skirt-plates are lowered to position. The said spring-forks are constructed with double shanks that have an elastic tendency to spring apart, so that as the sheathing of the incasement-jacket flares outwardly from that of the hull toward the bottom, as shown in Figs. 5, 6, and 7, so as to widen the intervening space as it approaches the bed-rock, the prongs of the spring-forks also expand, so as to hold the skirt-plates snugly to their position. Water-lime and other usual material for a concrete filling is then brought on board the coffer-dam, either by barges, which are drifted down alongside, or by derricks from the shore, or by any other suitable means. The concrete, after being prepared, is filled in between the hull 1 of the coffer-dam and its incasement-jacket 7, and as said casing is preferably four feet from the hull at bottom and three at top it follows that the solid concrete wall 40 is formed four feet thick at bottom, tapering upward to three feet in thickness at top and rising to the height of the hull and casing-jacket of the coffer-dam. After the first filling-in of the concrete, when sufficient has been laid to firmly hold the skirt-edges of the supplemental plates, then the spring-forks may be removed and laid away for future use. It is evident that, as the concrete is soft when it is laid in its bed on the bed-rock of the river and within the mold formed by the hull on the inside and the incasing-jacket on the outside, the said concrete accommodates itself to all the inequalities of the bed-rock, and forms in consequence a water-tight foundation and surmounting wall, which as it hardens becomes integral with the bed-rock of the river on which it is laid, and so firmly unites with it and is cemented to the rough surface of said bed-rock, as also to the hull and incasing-jacket of the coffer-dam, as to hold said coffer-dam from displacement. The additional weight thus added to the structure also adds greatly to the firm anchorage of the same upon the bed-rock, and its steel-clad sides protect the surface of the molded concrete wall and re-enforce the strength of the structure. The rotary pumps are next reversed in position, the suction-pipes 41, that were previously passed over the bulwarks of the incasing-jackets of the coffer-dams and passed down into the river alongside, and the rotary head of the pump discharging into the hold now changing position, the suction-pipes being now placed in the holds of the coffer-dams and the rotary heads projecting and discharging over the bulwarks into the river to empty the water from the hold. The rotary pump may be driven by the usual endless drive-belts from the engines that drive the windlass-drums, which belts engage with the drive-pulleys 42 on the projecting journal-shafts 43 of the radial suction-buckets of the pumps to effect the working of the same. The screw-nutted bolts that secure the removable angle-iron or steel bilge-sills 8 to the bottom flange of the side ribs 2 of the hull, and which bolts and other similar bolts also secure the removable bottom bilge-plates 8 to said bilge-sill, are then unscrewed and withdrawn, and said angle bilge-sills and bottom bilge-plates are removed out of the way, and the bed-rock of the river is thus left bare for future operations. A layer of said bed-rock is next removed from the inclosure within the bow of the coffer-dam to a depth, it may be, of from six inches to two feet or more, as the amount of resistible force required may demand, and a solid bulk-head of masonry 44 is erected, having its foundation within said excavation of the rock. The said bulk-head pier of masonry fills up the whole space within the bow of the coffer-dam, and thus strongly re-enforces the same to withstand the impingement, not only of the descending water, but also of the large volumes of ice and floating timber that come down the river and frequently come in contact with the coffer-dams. It is evident that after a series of such coffer-dams as are shown in Figs. 1 and 14 have been sunk on the bed-rock the same may be, if desired, connected together and to the banks of the river or intervening islands by the superstructure of a bridge thereon which would facilitate the passage of the operators and of material that is required in the work.

From the coffer-dam I lead a submerged race having its lower end immersed below the falls, which is constructed and arranged in the following manner: A vertical shaft 45, whose diameter is regulated in accordance with the amount of water that is to be passed through the flumes, is sunk in the rock to the depth required. When said depth has been reached, which may be to a depth nearly equal to that of the foot of the falls, or any intermediate depth, the shaft is drifted horizontally outward at 46 until it finds vent in front of the precipice over which the falls are precipitated. (See Figs. 7 and 10.) In said vertical and horizontal shafts in the rock is placed the vertical tubular cylinder 47, the horizontal tubular cylinder 48, and the quarter-turn tubular cylinder 49. A second quarter-turn tubular cylinder 50 connects the outer end of the horizontal tubular cylinder 48 with the vertical pendent tubular cylinder 51, the bottom of which is immersed in the water 14 at the foot of the falls, thus constituting a water seal at the discharge end of the cylinder that prevents the ascent of air through said cylinder, and thus makes of the tail-race a suction-race or reverse draw-head from the turbines in the flumes.

52 represents turbine wheels that have tight bearings on the rotary shafts 53, which shafts carry the turbines on both sides of the coffer-dam and have their bearings within the journal-boxes 54, which are secured by any suitable means within the hull and the incasing-jacket of the coffer-dam. These turbines, of which there are preferably two to each coffer-dam—that is, one to each flume—rotate within the turbine or flume-chambers and discharge the water, *via* the quarter-turn pipes 56, into the flaring mouth 57 of the vertical section 47 of the closed-section tail-race cylinder, the top of said flaring mouth of the cylinder being closed except at the entrance of the quarter-turn pipes by its cover 58. It will thus be seen that when the flood-gates 13 are lifted to allow a full flow of water through the grated screen 16 into the turbine-buckets within the flume, the water being discharged from said turbines via the quarter-turn pipes, the vertical, horizontal, and, lastly, pendent sections of the cylinder, the latter discharging beneath the surface of the water at the foot of the falls, thereby effecting a water seal, a suction tail-race is thereby effected that draws on the turbines as the head above said turbines at the same time drives the wheels. I thus utilize the law in hydraulics that the equivalent of the power obtained at the bottom of a column of falling water may be obtained at the top, providing the column falls through an air-tight shaft or tubular cylinder, for the suction is equal to the momentum. In this application of the above-named law in hydraulics the said law is proved in practice, the turbine wheel receiving the inflow into an air-tight suction-pipe having exercised on it and transmitting to the machinery that it drives the same amount of energy as a duplicate turbine receiving the outflow. Again, it will be seen that as the suction-power is a draw instead of a drive power, as are those of usual construction, it has the advantage of draw-powers in general over drives of a minimum of friction in its journal-bearings. By this means, also, I overcome the difficulty of placing and operating a power plant under the falls, where the violent agitation of the water is an almost insurmountable obstacle in the way of such a plant and the depressed lever is adverse to ease of transmission of the engendered power.

When the flood-gates are elevated by the hoisting-levers 83, the turbines are rapidly rotated by the combined momentum drive from the projectile force of the water as it enters their buckets and the suction draw from the water-sealed tail-race, and thus is driven the rotary shaft 53, on which the turbines are fast mounted, and two bevel-pinion gear-wheels 59, tight-keyed thereon, which drive corresponding bevel-pinions 61, with which they are geared. Then two rotary drive-shafts 62, on which said bevel-pinions 61 are fast mounted, work in journal-box bearings 63 and carry the drums 64. Cross drive-belts 65 are mounted on the pulleys 66 on the drive-shaft 62 and engage with the pulleys 67 on the shafts 68 of the dynamos 69, that are located on the lower deck, the belts preferably angling crosswise, respectively, those from the pulleys on the larboard side of the coffer-dam to the dynamos on the starboard side, and vice versa. Otherwise, instead of the cross drive-belts, which carry the power from the shafts on one side of the structure to the dynamo-shafts 68 on the other, frictional rolls 70 may be used that convey rotary movement from the drive-wheels 71 to the friction-pulleys 67 on the dynamo-shafts that vertically surmount them.

72 represents the upper structure that surmounts the coffer-dam, the upper deck 73 of which coffer-dam forms the floor of said upper structure.

74 represents endless drive-belts that carry the power from the drums 64 to the upper drums 75 on the shafts 76, and 77 are tension rollers or idlers that are adjusted to tighten said belt. Said shafts 76 also carry the individual drive-wheels 78, from which the belts 79 cross and engage with and drive the pulleys 80 on the individual shafts 81 of the dynamos 82, which dynamos are located on or above the upper floor, and thus the cross-belts from the drive-wheels 78 on the larboard or port side of the coffer-dam, respectively, drive the dynamo-pulleys on the starboard or right-hand side, and the drive-wheels on the starboard side with their cross-belts operate vice versa.

84 represents friction gear wheels or rolls, which may be used as transmitters in the place of the belted cross-gear, and in such case may be mounted on any suitable adjustable bearings that allow them to be thrown into and out of gear, as the case may be. The said friction gear-wheels transmit the movement from the individual drive-wheels 85, which in this modified form take the place of the individual drive-wheels 78, being mounted on the said shafts 76, which carry the drums 75, and thus is effected a direct transmission of the power. In such case the journal-bearings of said shafts are lowered, as shown on the starboard or right-hand side in Fig. 7, so as to adjust them to their friction-gear in contradistinction to their belted gear.

I have shown and described above both belt and friction drives, and do not confine myself to the exclusive use of either, as the respective uses of said two means for transmitting power may be varied in accordance with the exigencies of the case. The electric current thus generated can be conveyed to the point of usage by any suitable conductors, isolated in cables and either inclosed in conduits or elevated on poles or towers, as may be preferred.

I have described the turbines as I much prefer to place them above the vertical tubular shaft, or tail-race suction-cylinder with a reverse suction-head, the advantages of which I have shown and described; but the turbines may be placed, when preferred, in the lower end of said shaft, or in any intermediate position, in which case a vertical shaft and bevel-gear would be provided to elevate and transmit the power to the horizontal gear described below.

I have shown and described the concrete walls around the coffer dam as tapering in thickness from the base to the top, being preferably about four feet in thickness at bottom on the bed-rock and tapering to three feet in thickness at top, as shown in Figs. 5, 6, and 7, and I much prefer said construction with an enlarged flaring foundation base on the bed-rock at bottom, as it will be much more capable to withstand the heavy stress from the impingement of the descending water with the floating ice and timber that at some seasons of the year it carries with it; but while for the reasons given I prefer said flaring construction, yet I do not confine myself thereto, for the concrete wall may, if preferred, be constructed of a uniform thickness, in which case the incasement-jacket 7 would be made parallel with the sheeting of the hull, as shown in Fig. 12.

In the modification shown in Fig. 16, instead of forming the shaft 45 vertically in the bed-rock, I drive it diagonally from a point within the dam to a point below the falls, and I extend through this inclined shaft the tail-race, whose lower end is preferably submerged in the river below for the purpose before described. By this arrangement I am enabled to use a perfectly plain and straight cylinder for the race, doing away with the elbows and joints which are more or less costly, and at the same time provide an unobstructed passage for the water.

The invention herein described and claimed is also shown and described, but not claimed, in my application, Serial No. 320,631, filed August 13, 1889.

Having thus described my invention, what I claim as new, and desire to secure by Letters Patent, is—

1. The combination of the coffer-dam arranged above the falls and having a port in its side, a turbine whose casing is connected with said port, and a race leading from the said turbine through the bed of the river to a point below the falls, substantially as set forth.

2. In a device for utilizing waste water-power, the combination of the coffer-dam sunk to the bed-rock above the falls of the river, the vertical shaft sunk through said bed-rock from within said coffer-dam, the drift-shaft connected to the vertical shaft and opening out at the foot of the falls, the tubular suction-cylinder that passes through said vertical shaft and drift, and the pendent tube that descends therefrom into the water, and thus constitutes a water seal to secure suction through the tail-race, substantially as and for the purpose set forth.

3. In a device for utilizing waste water-power, the combination of the coffer-dam sunk to the bed-rock above the falls of a river, the shaft sunk through said bed-rock from within said coffer-dam to a point below the falls, the tail-race passing through said shaft, the pendent tube dipping into the water below the falls, the open-grated ports in the side of the coffer-dam, the turbine-chambers into which said ports open, the turbine wheels in said chambers, and the quarter-turn pipes leading from the turbine-chambers and emptying into the tail-race to effect a suction-draw on the turbines, substantially as and for the purpose set forth.

4. In a device for utilizing waste water-power, the combination of the coffer-dam sunk to the bed-rock above the falls, the vertical and drift shafts through said bed-rock drifting out at the foot of the falls, the tubular cylinder within said shaft having its lower end submerged and forming a suction tail-race, the open ports through the sides of the coffer-dam, the turbine-chambers into which said ports open, the quarter-turn pipes through which the water passes from the turbine-chambers to the suction-cylinder, the turbine wheels in said turbine-chambers, the flumes, the flood-gates that work in said flumes, the rotary shafts that carry said turbines, the drive-shafts, the bevel pinion-gear that carries the power from the turbine-shafts to said drive-shafts, the drums mounted on said drive-shafts, and the endless bands, drive-pulleys, and friction-gear that communicate the engendered power to the dynamos for generating electricity or otherwise utilizing said power, as also said dynamos, substantially as and for the purpose set forth.

CHRISTIAN J. ZEITINGER.

Witnesses:
F. A. HOPKINS,
GEO. L. WHEELOCK.